US008739164B2

(12) United States Patent
Chung et al.

(10) Patent No.: US 8,739,164 B2
(45) Date of Patent: May 27, 2014

(54) AUTOMATIC SUSPEND ATOMIC HARDWARE TRANSACTIONAL MEMORY IN RESPONSE TO DETECTING AN IMPLICIT SUSPEND CONDITION AND RESUME THEREOF

(75) Inventors: Jaewoong Chung, Bellevue, WA (US);
David S. Christie, Austin, TX (US);
Michael P. Hohmuth, Dresden (DE);
Stephan Diestelhorst, Dresden (DE);
Martin Pohlack, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 808 days.

(21) Appl. No.: 12/711,851

(22) Filed: Feb. 24, 2010

(65) Prior Publication Data
US 2011/0209151 A1 Aug. 25, 2011

(51) Int. Cl.
*G06F 9/46* (2006.01)
*G06F 13/00* (2006.01)
*G06F 13/28* (2006.01)

(52) U.S. Cl.
USPC .................... 718/101; 711/147; 711/E12.001

(58) Field of Classification Search
CPC ............ G06F 9/455; G06F 9/46; G06F 13/00
USPC ............................... 718/1, 101, 104; 711/147
See application file for complete search history.

(56) References Cited

U.S. PATENT DOCUMENTS

| 4,819,234 | A  | * | 4/1989  | Huber ........................... 717/129 |
| 5,428,761 | A  | * | 6/1995  | Herlihy et al. ................ 711/130 |
| 5,966,530 | A  | * | 10/1999 | Shen et al. ..................... 712/244 |
| 6,161,173 | A  | * | 12/2000 | Krishna et al. ................ 712/214 |
| 6,799,236 | B1 | * | 9/2004  | Dice et al. ..................... 710/200 |
| 7,404,041 | B2 | * | 7/2008  | Gara et al. ..................... 711/121 |
| 7,451,300 | B1 | * | 11/2008 | Anvin et al. ................... 712/244 |
| 7,516,366 | B2 | * | 4/2009  | Lev et al. ................... 714/38.13 |
| 2001/0047466 | A1 | * | 11/2001 | Topham ........................ 712/226 |
| 2003/0236962 | A1 | * | 12/2003 | Venkatraman ................ 711/207 |
| 2004/0154012 | A1 | * | 8/2004  | Wang et al. .................... 717/158 |
| 2004/0162948 | A1 | * | 8/2004  | Tremblay et al. ............. 711/137 |
| 2004/0162967 | A1 | * | 8/2004  | Tremblay et al. ............. 712/228 |
| 2006/0271767 | A1 | * | 11/2006 | Osanai et al. ................. 712/216 |

(Continued)

OTHER PUBLICATIONS

Zilles, Craig et al., "Extending Hardware Transactional Memory to Support AD Non-busy Waiting and Non-transactional Actions", 2006, 10 pages.*

(Continued)

*Primary Examiner* — Thomas Lee
*Assistant Examiner* — Phil Nguyen

(57) ABSTRACT

An apparatus and method is disclosed for a computer processor configured to access a memory shared by a plurality of processing cores and to execute a plurality of memory access operations in a transactional mode as a single atomic transaction and to suspend the transactional mode in response to determining an implicit suspend condition, such as a program control transfer. As part of executing the transaction, the processor marks data accessed by the speculative memory access operations as being speculative data. In response to determining a suspend condition (including by detecting a control transfer in an executing thread) the processor suspends the transactional mode of execution, which includes setting a suspend flag and suspending marking speculative data. If the processor later detects a resumption condition (e.g., a return control transfer corresponding to a return from the control transfer), the processor is configured to resume the marking of speculative data.

10 Claims, 7 Drawing Sheets

(56) References Cited

U.S. PATENT DOCUMENTS

| | | | | |
|---|---|---|---|---|
| 2006/0294326 | A1* | 12/2006 | Jacobson et al. | 711/156 |
| 2008/0057948 | A1* | 3/2008 | Mittal et al. | 455/426.1 |
| 2010/0332538 | A1* | 12/2010 | Gray et al. | 707/774 |
| 2010/0332721 | A1* | 12/2010 | Yamada et al. | 711/6 |
| 2011/0209154 | A1* | 8/2011 | Gooding et al. | 718/103 |
| 2011/0289180 | A1* | 11/2011 | Sonnier et al. | 709/213 |
| 2011/0296148 | A1* | 12/2011 | Cain et al. | 712/228 |

OTHER PUBLICATIONS

Moravan, Michelle J. et al., "Supporting Nested Transactional Memory in AC LogTM", Oct. 21-25, 2006, 12 pages.*
Herlihy, Maurice et al., "Transactional Memory: Architectural Support for AB Lock-Free Data Structures", May 1993, 11 pages.*
Bobba, Jayaram et al., "Performance Pathologies in Hardware Transactional Memory", Jun. 9-13, 2007, 11 pages.*
L. Hammond, V. Wong, M. Chen, B. D. Carlstrom, J. D. Davis, B. Hertzberg, M. K. Prabhu, H. Wijaya, C. Kozyrakis, and K. Olukotun, "Transactional Memory Coherence and Consistency," In the Proceedings of the 31st Intl. Symposium on Computer Architecture (ISCA), Munich, Germany, Jun. 2004, 12 pages.
C. Zilles and L. Baugh, "Extending hardware transactional memory to support non-busy waiting and non-transactional actions," In ACM SIGPLAN Workshop on Languages, Compilers, and Hardware Support for Transactional Computing, Jun. 2006, 10 pages.
Ravi Rajwar, Maurice Herlihy, Konrad Lai, "Virtualizing Transactional Memory," In the Proceedings of the 32nd annual International Symposium on Computer Architecture(ISCA), Jun. 4-8, 2005, 12 pages.
Hany E. Ramadan, Christopher J. Rossbach, Donald E. Porter, Owen S. Hofmann, Aditya Bhandari, and Emmett Witchel, "MetaTM/TxLinux: Transactional Memory for an Operating System," ISCA, Jun. 9-13, 2007, 12 pages.
M. Moravan, J. Bobba, K. Moore, L. Yen, M. Hill, B. Liblit, M. Swift, and D. Wood, "Supporting nested transactional memory in LogTM," In ASPLOS-XII, 2006, 12 pages.
H. Ramadan, C. Rossbach, and E. Witchel, "The Linux kernel: A challenging workload for transactional memory," In Proceedings of the Workshop on Transactional Memory Workloads, Jun. 2006, 6 pages.

* cited by examiner

| Transfer Type | Suspension Events | Resumption Events |
|---|---|---|
| Far control transfer | CALL | RET |
| System call | SYSCALL, SYSENTER | SYSRET, SYSEXIT |
| Exception/Interrupt | INT, INTn, exception, interrupt | IRET, RSM |
| | | |

*FIG. 6*

AUTOMATIC SUSPEND ATOMIC HARDWARE TRANSACTIONAL MEMORY IN RESPONSE TO DETECTING AN IMPLICIT SUSPEND CONDITION AND RESUME THEREOF

BACKGROUND

Hardware Transactional Memory (HTM) is a mechanism in computer architecture for supporting parallel programming. With HTM, programmers may simply declare a group of instructions as a transaction and the HTM system guarantees that the instructions in the transaction are executed in an atomic and isolated way. Atomicity means that all the instructions of the transaction are executed as a single atomic block with respect to all other concurrent threads of execution. Isolation means that no intermediate result of the transaction is exposed to the rest of the system until the transaction completes. HTM systems may allow transactions to run in parallel as long as they do not conflict. Two transactions may conflict when they both access the same memory area and either of the two transactions writes to that memory area.

Many existing HTM designs present correctness and/or security issues in the presence of program control transfers, such as transfers to an operating system in response to a system call, exception, interrupt, signal, or other event. Traditionally, such program control transfers may occur transparently to the HTM system. If such a transfer occurs during transactional execution, operating system code may be executed as part of a transaction. This may cause problems with correctness and/or security. In some traditional systems, if the transaction is aborted while executing in the operating system, unexpected side effects may occur.

In one example, consider a TCP/IP network device driver. When receiving a packet from the network, an interrupt is triggered to execute the device driver code. Suppose that the processor receives the interrupt while running an application transaction. The program control would be transferred to the device driver and under a traditional HTM system, the driver would run as part of the transaction since the traditional HTM design simply considers all the instructions between the start and end of the transaction to be part of the transaction.

This behavior may cause at least two problems. First, a system failure may occur if the transaction is aborted while the device driver code executes. For example, if the device driver is configured to write memory-mapped registers to manage the network interface hardware, and is aborted in the middle of changing the register values, the interface hardware may be left in an inconsistent state, breaking the integrity of the network system. Additionally, in the example given above, aborting the transaction during or after the device driver executes as part of the transaction may cause the network connection to lose packets. For example, after the driver code processes a packet, the driver sends an acknowledge message to the packet sender. At this point, the sender may delete the packet since there is no need for retransmission. However, if the transaction is later aborted, the memory write operations that were used to store the packet on the receiver may be rolled back and the packet may be permanently lost, thereby violating the reliable communication guarantee of the TCP/IP system.

Second, security issues are another side effect of transparently jumping to operating system code as part of a transaction. Many modern processors support security features to separate operating system and application code execution. For example, the x86 architecture allows an operating system and applications to use different code segments and privilege levels (e.g., user-level vs. kernel-level privilege) by switching the code segment selector at the boundary of system calls. However, traditional HTM systems often do not checkpoint and manage some parts of processor state, such as the code segment selector. When a transaction that originates in user-level code executes a system call to the operating system, the privilege level is increased. If the transaction aborts, a traditional HTM may not be configured to restore the privilege level to the lower level. Accordingly, a security leak may result. Malicious programs may be able to take advantage of this security hole to acquire an operating system privilege level after a transactional abort.

SUMMARY

An apparatus and method is disclosed for a computer processor configured to access a memory shared by a multiple processing cores and to execute memory access operations in a transactional mode as a single atomic transaction. The apparatus is configured to suspend the transactional mode in response to determining an implicit suspend condition. As part of executing the transaction, the processor marks data accessed by the speculative memory access operations as being speculative data. In response to determining an implicit suspend condition (including by detecting a control transfer in a thread being executed, such as to an operating system) the processor suspends the transactional mode of execution, which includes setting a suspend flag and suspending the marking of speculative data. Later, if the processor detects a resumption condition (e.g., by detecting a return control transfer corresponding to a return from the control transfer), the processor resumes the transactional mode of execution by resuming the marking of speculative data.

In some embodiments, the processor may be further configured to detect that the atomic transaction has failed while the transaction is suspended. In some embodiments, the processor may be responsive to detecting that a suspended transaction failed by setting an abort flag and checking the abort flag when an attempt is made to resume the transaction. If the check determines the abort flag to be set, then the processor aborts the transaction. In some embodiments, the processor may be configured to save/restore values of the abort flag and/or the suspend flag as part of the execution context.

BRIEF DESCRIPTION OF THE DRAWINGS

FIG. 6 is a table listing various types of control transfers during which suspension may be executed, according to some embodiments.

Figure 1:
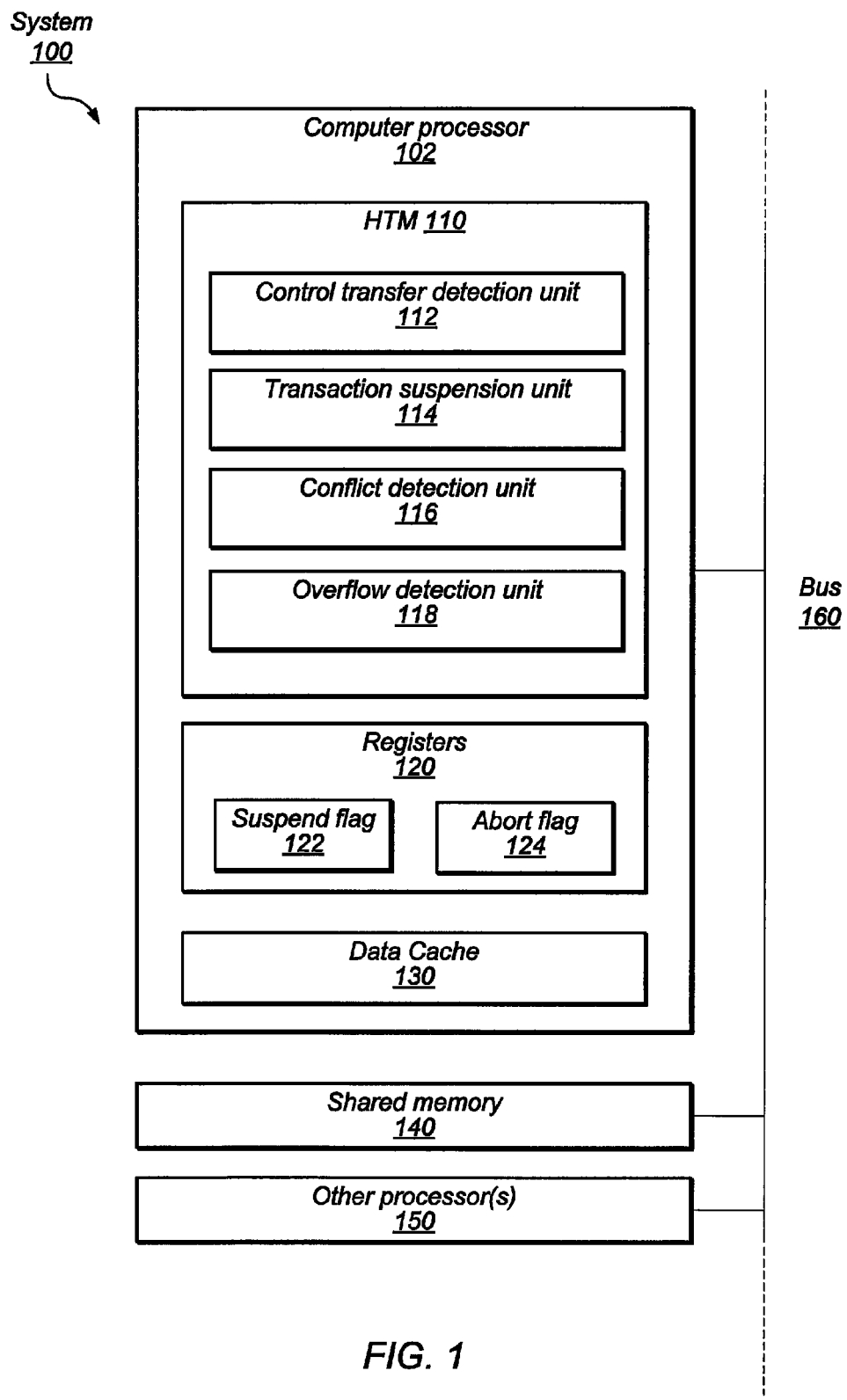
FIG. 1 is a block diagram illustrating a computer system configured to implement an HTM mechanism with suspend/resume capability, according to some embodiments

Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Traditional HTM designs present correctness and/or security issues in the presence of program control transfers. As used herein, the term "control transfer" refers to an instruction or event that signals, causes, or indicates a change in program flow—e.g., from some executing software program to some supervisory program, or error or interrupt handler, and vice-versa. In some embodiments, the supervisory program may be an operating system. In various embodiments, different operating systems may be used (e.g., Linux, Windows™, etc.), each of which may be implemented as software that supports a computer's basic functions such as scheduling tasks, executing applications, and controlling peripherals. In some embodiments, the operating system may include a kernel for implementing basic functionality. In various embodiments, the kernel of the operating system may be monolithic or may be a micro-kernel.

In some embodiments, one or more operating systems may be virtual (e.g., the operating system may be a "guest" OS within a virtual machine). In such embodiments, a control transfer may transfer program control between a program and a virtual operating system, to a hypervisor used to deploy the virtual operating system, or to another runtime system. While the embodiments described herein refer to transfer controls to/from an operating system, it should be understood that embodiments may be adapted to include transfers to/from virtual operating systems, hypervisors, and/or any other runtime system. As such, unless otherwise indicated, a "control transfer" is not limited to a change in program flow between some executing code and the operating system on which it is running.

In different circumstances, a control transfer may be performed in response to detecting different events, such as a program executing a system call to an operating system, a software and/or hardware exception, a hardware interrupt, a software signal, or other event. Each control transfer from an application to an operating system may have a corresponding return control transfer, such that the return control transfer returns control to the program from which the original (suspending) control transfer occurred. For example, if a program invokes a system call to control transfer to the operating system, the operating system may respond by executing some functionality and then returning control to the point in the invoking program immediately following the system call invocation.

In various embodiments, a hardware transactional memory system (HTM) may provide functionality for executing a plurality of memory access operations as a single atomic transaction. In some embodiments, a program may execute an initiating instruction to initiate a transactional mode of execution and a subsequent terminating instruction to end the transactional mode of execution. The HTM may be configured to ensure that some or all of the memory operations executed by the application in the transactional mode (i.e., between the initiating and terminating instructions) are performed atomically with respect to the execution of other threads/processors in the system.

To ensure atomic execution, the HTM may be configured to treat memory access operations of the transaction as speculative until the transaction is successfully committed and to monitor for an abort condition. For example, the HTM may mark data written or read by the speculative instructions during the transactional mode of execution as speculative, and if the transaction completes successfully (i.e., no abort condition was detected), the HTM may mark the data as non-speculative and/or otherwise incorporate it into the shared memory. On the other hand, if an abort condition is detected, then the HTM may be configured to drop/invalidate the speculative data and/or to roll back effects of speculative data writes to shared memory.

According to various embodiments, hardware mechanisms (e.g., on the processor) may be configured to automatically detect a suspension condition, including by detecting a program control transfer within an active transaction, and to respond by suspending the transactional execution mode. In some embodiments, the HTM may be configured to subsequently detect the corresponding return control transfer and, if appropriate, resume the transactional mode of execution.

In some embodiments, while the transactional execution mode is suspended, the processor does not mark data accessed by memory operations as speculative. Thus, in such embodiments, if a transaction is aborted, memory access operations that were executed while transactional mode was suspended would not be rolled back.

In some embodiments, if an abort condition is detected while transactional execution is suspended, the HTM may be configured to delay aborting the transaction until after the transactional mode resumes. For example, in response to detecting an abort condition (caused by, e.g., a data conflict), the HTM may set an abort flag and continue to execute in suspended transactional mode. Upon resuming transactional execution mode, the HTM may check the abort flag and perform the abort if the flag is set.

In various embodiments, suspension/resumption of transactional execution mode may be performed by the HTM in a manner that is transparent to the executing software. That is, since the HTM is configured to automatically detect suspend/resume conditions and to suspend/resume transactional execution mode, software (e.g., program and/or operating system) need not be modified to execute specialized instructions to instruct the HTM to suspend or resume the transactional execution mode at appropriate times.

FIG. 1 is a block diagram illustrating a computer system configured to implement an HTM mechanism with suspend/resume capability, according to some embodiments. In FIG. 1, system 100 (which may be referred to as a transaction memory system in some embodiments) comprises computer processor 102, shared memory 140, and other processors 150. These components may be connected by bus 150, which may be of various types of interconnect, including broadcast and/or point-to-point. In various embodiments, other processors 150 may include one or more processors that share memory 140 with computer processors 102. In some embodiments, each of processors 150 may be configured as computer processor 102.

According to the illustrated embodiment, computer processor 102 includes HTM 110 for implementing hardware transactional memory functionality with suspend/resume capabilities, as described above. In various embodiments, HTM 110 may mark speculative data in different ways. For example, HTM 110 may use a cache-based speculative data buffer, including by storing and marking speculative data in a data cache, such as data cache 130. In other embodiments, speculative data buffers may be implemented in other structures, such as in a load, store, or load/store queue. In different embodiments, each processor may implement multiple, cooperating speculative data buffers (e.g., in data cache 130 and in a load/store queue)

In system 100, HTM 110 includes various hardware units, including control transfer detection unit 112, transaction suspension unit 114, conflict detection unit 116, and overflow detection unit 118. In various embodiments, different ones of these components may be combined in whole or part, or broken into further subcomponents.

In some embodiments, control transfer detection unit 112 may be configured to determine a suspend condition. In certain embodiments, this suspend condition may be an "implicit" suspend condition, meaning that the suspend condition is determined based on some set of criteria other than the existence of an explicit instruction (e.g., "pause" or "suspend"). In some embodiments, unit 112 may be configured to determine that a suspend condition exists based in part on detecting a control transfer in a thread that is being executed by processor 102. For example, control transfer detection unit may detect a control transfer caused by a system call invocation or a hardware interrupt (e.g., I/O interrupt).

In various embodiments, determining a suspend condition may also include confirming that processor 102 is currently in transactional execution mode and/or that the processor is executing in a lower level (e.g., application-level) of privilege rather than at a higher level (e.g., kernel-level) of privilege. For example, in some systems, a current privilege level (CPL) is stored in a register (e.g., of registers 120) and may hold values indicating various levels of privilege. In such systems, at higher levels of privilege, the system grants an executing thread access to protected resources, such as various memory regions, I/O ports, and/or special instructions. On the x86 architecture, for example, there are 4 privilege levels ranging from 0 which is the most privileged, to 3 which is least privileged. On such systems, level 0 is used for the kernel/executive and level 3 for application programs. In some systems, when software needs to execute instructions at an elevated privilege level (such as when executing operating system code), the software may execute one or more instructions to raise the level of privilege (e.g., from 3 to 0) and execute one or more instructions to lower the level of privilege (e.g., from 0 to 3) when the elevated privilege is no longer needed. In some systems, operating system code may raise and lower privilege levels on entry and exit respectively.

In some embodiments, control transfer detection unit 112 may be configured to detect a suspension condition in response to detecting a) a control transfer to the operating system, b) that the processor is executing in transactional mode, and c) that the current level of privilege is not elevated (e.g., is 3). In response to detecting the suspend condition, control transfer detection unit 112 may notify transaction suspension unit 114 of the suspend condition. In response, the transaction suspension unit 114 may be configured to respond by suspending the transactional mode of execution, such as by setting suspend flag 122 in registers 120. As described above, while transactional mode is suspended, the processor is configured, in some embodiments, to suspend the marking of data accessed by memory operations as speculative. However, data that was marked as speculative before the transactional mode was suspended is retained along with the speculative marks. Thus, in certain embodiments, if an abort occurs, modifications to memory values that occurred during the suspension would not be rolled back while those that occurred before or after the transactional mode was suspended would be rolled back.

In some embodiments, control transfer detection unit 112 may be further configured to determine a resumption condition, including by detecting a return control transfer corresponding to the control transfer that was detected to determine the suspend condition. For example, if the control transfer that was detected to determine the suspend condition was a system call to the operating system, the return transfer call may be the return from the system call.

In some circumstances, a control transfer that originally causes a suspend condition (referred to herein as the "suspending" transfer) may be followed by one or more subsequent control transfers before a return from the suspending control transfer is executed. In this case, although multiple return control transfers may be executed, the transactional mode would not be resumed until the return control transfer corresponding to the suspending control transfer is executed.

In some embodiments, the control transfer detection unit 112 may be configured to respond to detecting the resumption condition by notifying the transaction suspension unit to resume the transactional mode of execution. In some embodiments, resuming the transactional mode may include unsetting suspend flag 122 and/or checking abort flag 124 as described below.

According to the illustrated embodiment, HTM 110 may include various other mechanisms and/or units, such as conflict detection unit 116. In various embodiments, the conflict detection unit 116 may be configured to detect different kinds of abort conditions. For example, the conflict detection unit may be configured to monitor cache coherency messages (probes) received from other processors 150 as part of a cache coherency protocol, such as MESI or MOESI. If one or more such probes indicate a data conflict, then the conflict detection unit 116 determines that an abort condition exists and the transaction attempt may be aborted.

As described above, in some embodiments, the HTM may be configured to delay aborting a transaction attempt that is executing in suspended transactional mode until the transactional execution mode is resumed. In such embodiments, in response to detecting an abort condition during suspended transactional mode, the conflict detection unit may be configured to set an abort flag (i.e., store a predetermined value in a suitable storage location), such as 124, rather than aborting and/or rolling back the transaction right away. When the transactional mode of execution is resumed (e.g., upon returning from the operating system kernel), the HTM may detect that abort flag 124 is set and respond by aborting the transaction attempt.

Various other hardware units may detect other abort conditions. For example, overflow detection unit 118 may be configured to detect an abort condition in the form of a speculative buffer overflow condition. A buffer overflow condition may be detected when executing the transaction requires that a given portion of data be buffered in a speculative buffer (e.g., one implemented in data cache 130) that has insufficient capacity to buffer the new speculative data. As used herein, a speculative buffer overflow refers to an overflow condition being detected, and not to a situation where speculative data is actually evicted from the buffer.

As with data conflicts, if overflow detection unit 118 detects an overflow condition while the processor is executing in suspended transactional mode, then it may set abort flag 124, which may cause HTM 110 to abort/rollback the transaction attempt when transactional execution mode is resumed.

Figure 2:
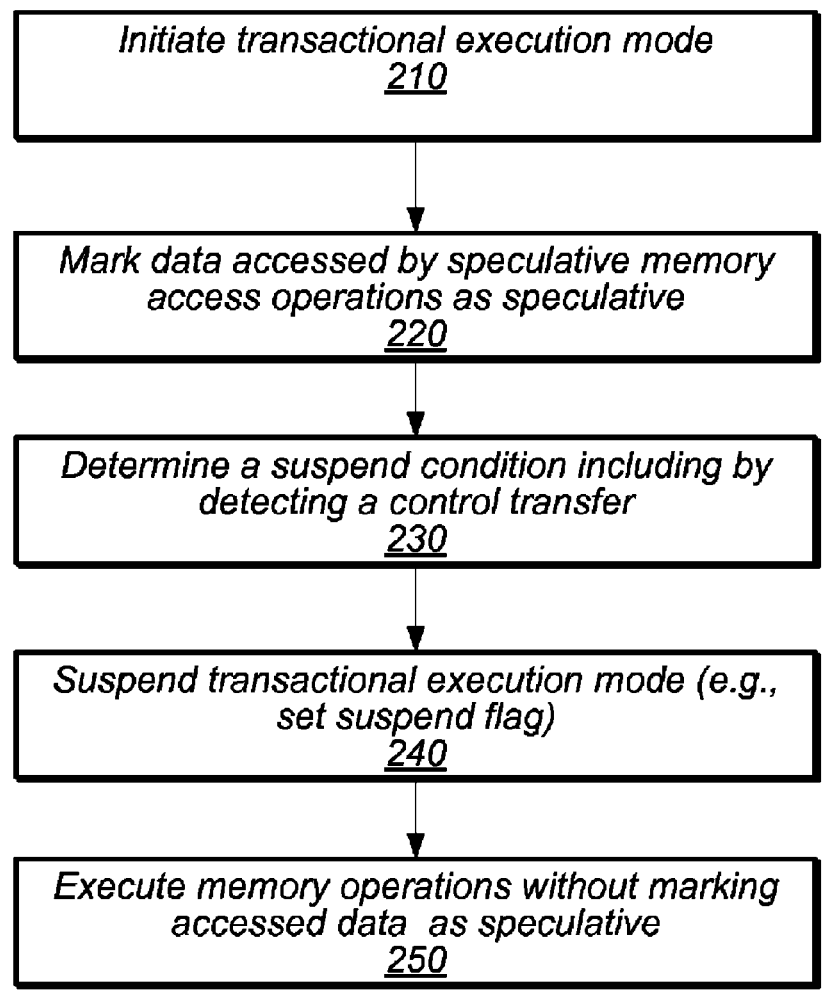
FIG. 2 is a flow diagram illustrating a method for suspending a transactional mode of execution while executing a memory transaction, according to some embodiments.

FIG. 2 is a flow diagram illustrating a method for suspending a transactional mode of execution while executing a memory transaction, according to some embodiments. Method 200 may be executed by an HTM (such as HTM 110 of FIG. 1) during the course of executing a computer program configured to utilize memory transactions.

According to the illustrated embodiment, method 200 begins when the processor begins executing in transactional mode, as in 210. In some embodiments, this may be performed in response to a software program executing one or more architected instructions to initiate transactional execution. Initiating transactional execution mode, as in 210, may include setting one or more flags, such as in registers 120 of system 100.

Once the processor is executing in transactional mode, it may be configured to mark data accessed by speculative memory access operations as speculative, as in 220. In some embodiments, every memory access operation executed in transactional mode may be considered speculative and thus, data accessed by each such memory access operation may be marked as speculative. In other embodiments, a subset of the memory access operations within a transaction may be explicitly designated as speculative. In some such embodiments, only the data accessed by each of these explicitly speculative instructions may be marked as speculative in 220.

In various embodiments, the process of marking the data as speculative may be dependent on the type of speculative buffer being used by the HTM. For example, for HTMs that buffer speculative data in a data cache, marking the data as speculative may include storing a copy of the data in the data cache and marking the cache block of the cache containing the speculative data using one or more speculative bits. Marking a speculative bit may also be used for marking speculative data in buffers implemented by other structures, such as a load/store queue.

According to the illustrated embodiment, at some point during transactional execution, the HTM (or some component thereof, such as control transfer detection unit 112), determines a suspend condition, including by detecting a control transfer, as in 230. In some embodiments, a suspend condition may be one that indicates that program control is about to be transferred to the operating system kernel. For example, in some embodiments, a suspend condition may be detected in response to a system call being made and the current privilege level of the processor corresponding to some given application level (e.g., this given privilege level may be 3 (user or application level) in some embodiments). In another example, the suspend condition may be detected in response to detecting a hardware interrupt and that the CPL indicates an application level privilege, such as level 3. Thus, in such embodiments, if a control transfer is detected during transactional execution, the HTM may check the CPL to determine if the control transfer is one from an application to an operating system kernel. If so, a suspend condition may be determined to exist.

As in method 200, in response to detecting a suspend condition, the HTM may suspend transactional execution, as in 240. Suspending transactional execution may include setting a suspend flag (e.g., suspend flag 122, which refers to a value stored in some storage location) which may signal to the HTM that transactional execution mode is suspended.

Once the transactional execution mode is suspended, the processor may execute memory operations without marking accessed data as speculative, as in 250. That is, once control is transferred to the operating system, the transactional execution mode is suspended and memory operations executed by the operating system are not treated as speculative, and thereby not subject to rollback in the event of an abort. As described above, in some embodiments, a processor may not abort a transaction attempt while in suspended mode, even if an abort condition is detected. In such embodiments, the processor may respond to detecting an abort condition by setting an abort flag (a value stored in some storage location) and aborting (including rolling back) the transaction once transactional execution mode is resumed.

Figure 3:
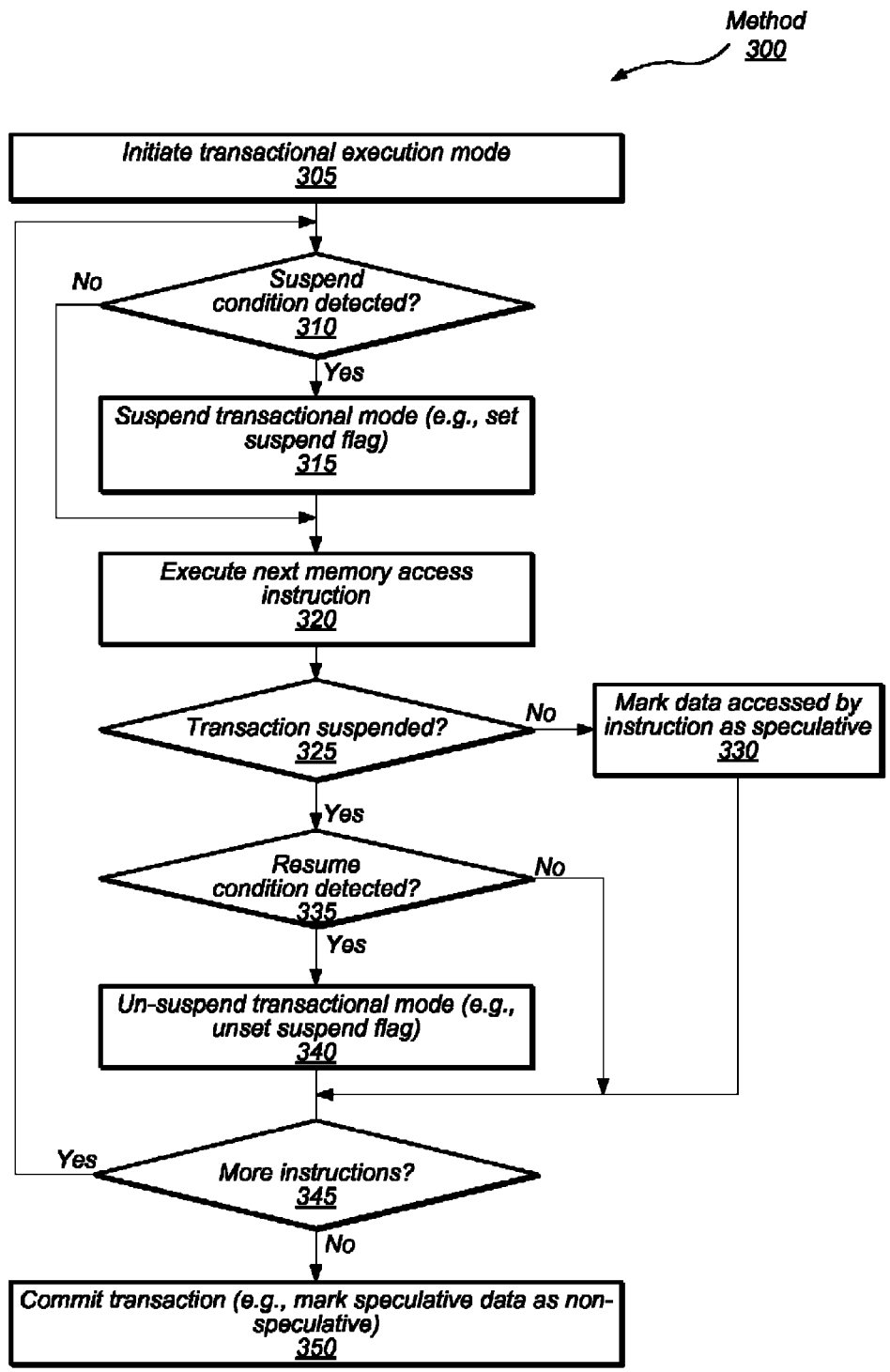
FIG. 3 is a flow diagram illustrating a method for executing an atomic transaction using an HTM, including by suspending the transactional mode of execution during the transaction.

FIG. 3 is a flow diagram illustrating a method for executing an atomic transaction using an HTM, including by suspending the transactional mode of execution during the transaction. Method 300 begins by initiating transactional execution mode, as in 305. As before, the processor may perform this step in response to executing a transaction initiating instruction.

In method 300, if the HTM detects a suspend condition (as indicated by the affirmative exit from 310), then the HTM may suspend the transactional mode, such as by setting a suspend flag in 315. Detecting a suspend condition in 310 may be analogous to detecting the suspend condition in 230 of FIG. 2, and may include detecting a control transfer into the operating system during an active (not suspended) transactional mode. In response to detecting a control transfer into the operating system, the HTM may also record the type of control transfer used, such that the appropriate return control transfer may later be identified. If no suspend condition is detected, as indicated by the negative exit from 310, then the transaction is not suspended.

According to method 300, the processor then executes the next memory access instruction, as in 320. If the transactional mode of execution is not suspended (as indicated by the negative exit from 325), then the HTM marks any speculative data accessed by the memory operation as speculative, as in 330. For example, if the operation is a read operation, then the HTM may note that the memory location from which the value was read is part of the transaction's read set. Thus, if an invalidating probe is received indicating that another processor has modified the value stored at the speculative memory location, the processor detects an abort condition.

As described above, in some embodiments, every memory operation in an active transaction may be considered speculative, while in other embodiments, some data and/or memory operations may be explicitly identified as speculative while others are not. In such embodiments, a memory operation that accesses only non-speculative data would not cause any data to be marked as speculative. For example, in one such embodiment, method 300 may be augmented such that the negative exit from 325 is further contingent on the memory operation and/or data accessed by the memory operation having been explicitly marked as speculative.

In embodiments wherein a cache is used to implement the speculative data buffer, the cache block corresponding to the read data may be marked using a "speculative flag" indicating that it was read in transactional execution mode. In some embodiments, each cache block may comprise or be otherwise associated with a "read speculative flag" and a "write speculative flag", indicating the type of speculative memory access operation that was performed on the memory area (if any). In various embodiments, these flags may be combined or separate, and may be used in different speculative buffers, such as those implemented by a data cache, a load/store queue, and/or others.

According to the illustrated embodiment, if the transaction is suspended (as indicated by the affirmative exit from 325), then no marking of speculative data (as in 330) is performed by the HTM. Instead, the HTM may determine whether a resume condition exists, as in 335. In some embodiments, a resume condition may be detected in response to detecting a return control transfer from the operating system to the application. In some embodiments, detecting such a return control transfer may include determining that a control transfer being executed (or about to be executed) is a return corresponding to the original (suspending) control transfer into the operating system. Additionally, detecting a resume condition may be further dependent on the CPL indicating that the processor is executing in a privileged (e.g., kernel-level) mode, such as level 0.

In method 300, if a resume condition is detected, as indicated by the affirmative exit from 335, then the transactional mode of execution may be resumed, as in 340. Resuming the transactional mode of execution may include unsetting the suspend flag, thereby indicating to the HTM that the marking of speculative data should resume as appropriate. As discussed below in reference to FIG. 4, resuming the transactional mode may also include determining whether an abort condition was detected during the suspension (e.g., by checking an abort flag).

In the illustrated embodiment of FIG. 3, if the transaction includes more instructions (as indicated by the affirmative exit from 345), then the processor may repeat method 300 (as indicated by the feedback loop from 345 to 310). Otherwise, as indicated by the negative exit from 345, the transaction may be committed, as in 350. In various embodiments, committing the transaction may include different steps. For example, as part of committing the transaction, the marked speculative data may be marked as non-speculative. In some embodiments, committing the transaction may include writing speculatively written data to shared memory or otherwise sharing the speculatively written values with the other processors in the system. The reader will note that although method 300 includes executing at least one a memory access instruction between detecting a suspend condition in 310 and detecting a resume condition in 335, those skilled in the art will appreciate that this is not necessarily the case for all instances of suspended transactions.

Figure 4:
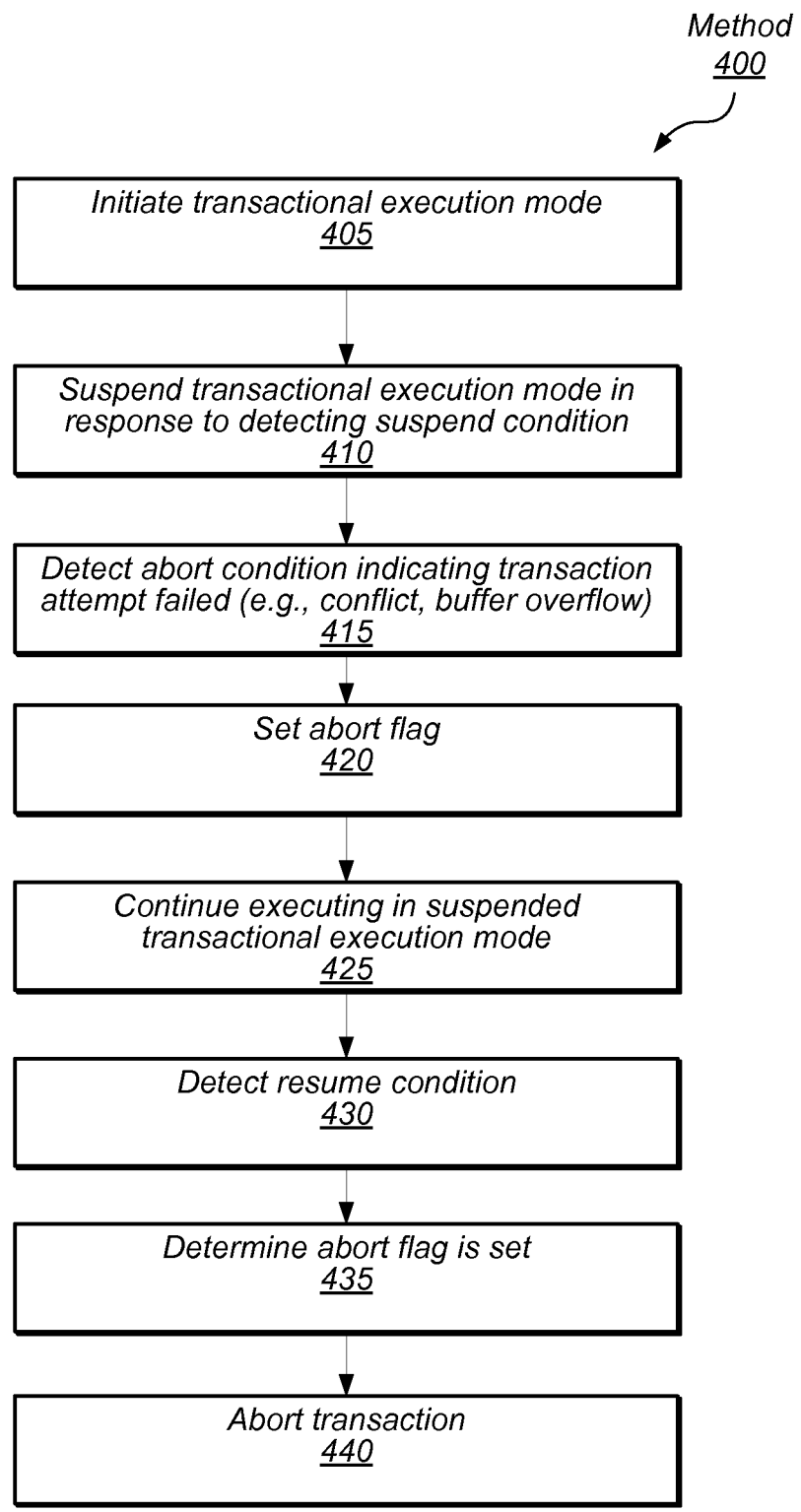
FIG. 4 is a flow diagram illustrating a method for handling an abort condition detected during suspended transactional mode, according to some embodiments.

FIG. 4 is a flow diagram illustrating a method for handling an abort condition detected during suspended transactional mode, according to some embodiments. As before, the method begins by initiating a transactional execution mode, as in 405, and suspending transactional execution mode in response to detecting a suspend condition, as in 410. Once the transactional execution mode is suspended, the processor may begin executing operating system code in a non-transactional mode (i.e., without marking accessed data as speculative).

According to method 400, the HTM may detect an abort condition indicating that the transaction attempt failed, as in 415. In various embodiments, different circumstances may cause an abort condition, including a data conflict with another processor or a speculative buffer overflow condition being detected, as described above. For example, a data conflict may occur if another processor accesses a memory area marked by the processor as speculative, and either of the processors modified the data stored in the memory area. In another example of an abort condition may be detected in response to a speculative buffer overflow condition being detected, such as when a speculative data buffer (e.g., data cache) has insufficient capacity to buffer all the speculative data accessed during the transaction. The buffer may have insufficient capacity because too much speculative and/or non-speculative data is being buffered simultaneously.

In traditional systems, an HTM would abort a transaction immediately upon detecting the abort condition. However, this may leave various structures of the operating system software in an inconsistent state. Instead, HTMs in various embodiments may delay aborting a suspended transaction until after it resumes. For example, in method 400 of FIG. 4, in response to detecting the abort condition in 415, the HTM sets an abort flag, as in 420, and continues to execute in suspended transactional mode, as in 425.

While execution continues in the operating system in suspended transactional mode, various additional control transfers may be performed. At a later point, the HTM may detect a resume condition (as in 430) in response to detecting a return control transfer matching the suspending control transfer and returning control to the application code.

According to the illustrated embodiment, after returning to the application code and resuming transactional execution, the HTM may determine whether the abort flag is set, as in 435. If the abort flag is not set, then the transaction did not fail during the suspended execution mode and so the HTM may clear the suspended flag and continue to execute in transactional mode. However, in method 400, the abort flag was set in 420, so the HTM will determine in 435 that the abort flag is set and in response, abort the transaction, as in 440.

As discussed above, aborting the transaction in 440 may include marking the speculative data as invalid. This may be referred to herein as "dropping" the speculative data. Once speculative data is dropped, it is not stored to shared memory for access by other processors. For example, if speculative data in a speculative buffer is marked as invalid, the processor does not rely on this data for future instruction execution nor forwards it to shared memory. Furthermore, no future transactional aborts or cache coherency actions need be taken to coordinate invalidated data with other processors in the system.

Figure 5:
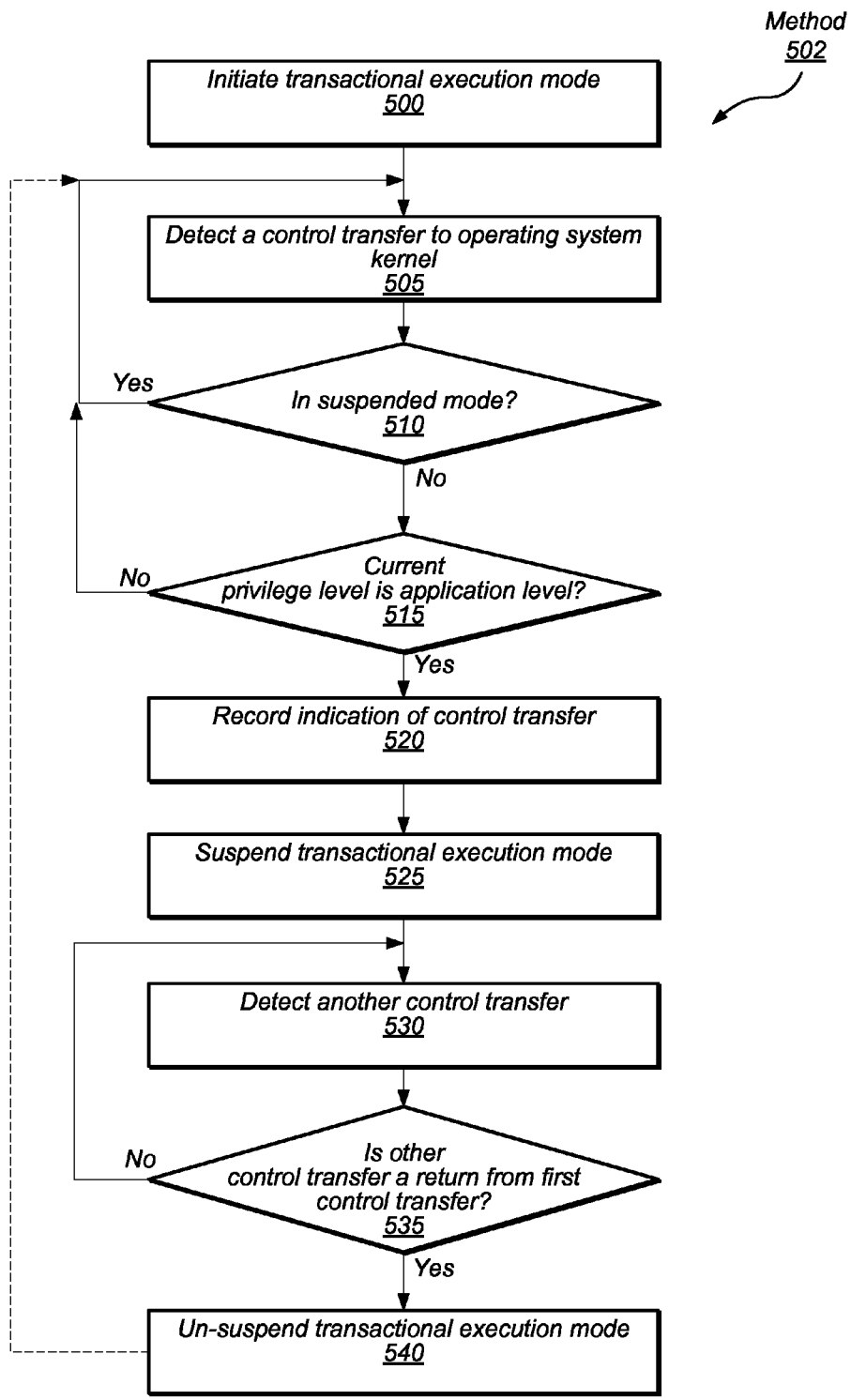
FIG. 5 illustrates a specific method for implementing an HTM with automatic suspend/resume capabilities, according to some embodiments.

FIG. 5 illustrates a specific method for implementing an HTM with automatic suspend/resume capabilities, according to some embodiments. Method 502 begins by initiating a transactional execution mode, as in 500. During execution, the HTM detects a control transfer to the operating system kernel, as in 505. If the processor is executing in suspended transactional mode, as indicated by the affirmative exit from 510, then no additional action needs to be taken with regard to suspending the transactional execution mode. However, if the processor is not currently in a suspended mode of execution, then the HTM may check the current privilege level, as in 515. If the privilege level is elevated (e.g., kernel-level 0, or a non-application level in some embodiments), as indicated by the negative exit from 515, then no further action need be taken with respect to suspending the transactional mode of execution.

According to the illustrated embodiment, if the processor is not in suspended transactional mode (negative exit from 510) and the current privilege level (CPL) is at a lower level of privilege (e.g., application-level 3) as indicated by the affirmative exit from 515, then the HTM may record an indication of the control transfer event (as in 520) and suspend transactional execution mode (as in 525).

In method 502, after the transactional execution mode is suspended in 525, the HTM may detect another control transfer, as in 530. If this subsequent control transfer detected in 530 is a return control transfer corresponding to the suspending control transfer of 505 (as indicated by the affirmative exit from 535), then the processor may return execution to the application mode and the HTM may resume (i.e., un-suspend) the transactional execution mode, as in 540. However, if the control transfer is not a return control transfer corresponding to the suspending control transfer of 505, then the HTM may continue in transactional execution mode until the corresponding return control transfer is found, as indicated by the feedback loop from 535 to 530. In some instances, a given transaction may suspend and/or resume multiple times (e.g., as indicated by the optional feedback loop from 540 to 505) before finally being committed.

In various embodiments, any number of control transfers may be executed between the suspending transfer and its corresponding return control transfer. However, in some embodiments, only when the return control transfer corresponding to the suspending transfer is detected (affirmative exit from 535) will the HTM resume transactional mode.

FIG. 6 is a table listing various types of control transfers during which suspension may be executed, according to some embodiments. The control transfer types listed include far control transfers, system calls, and exceptions/interrupts. To each type of transfer may be detected by a respective listed suspension event and a return from the transfer may be detected by the respective listed resumption events. For example, a system call into an operating system may be detected by detecting a SYSENTER instruction and the matching return control transfer would be indicated by a SYSEXIT instruction.

Figure 7:
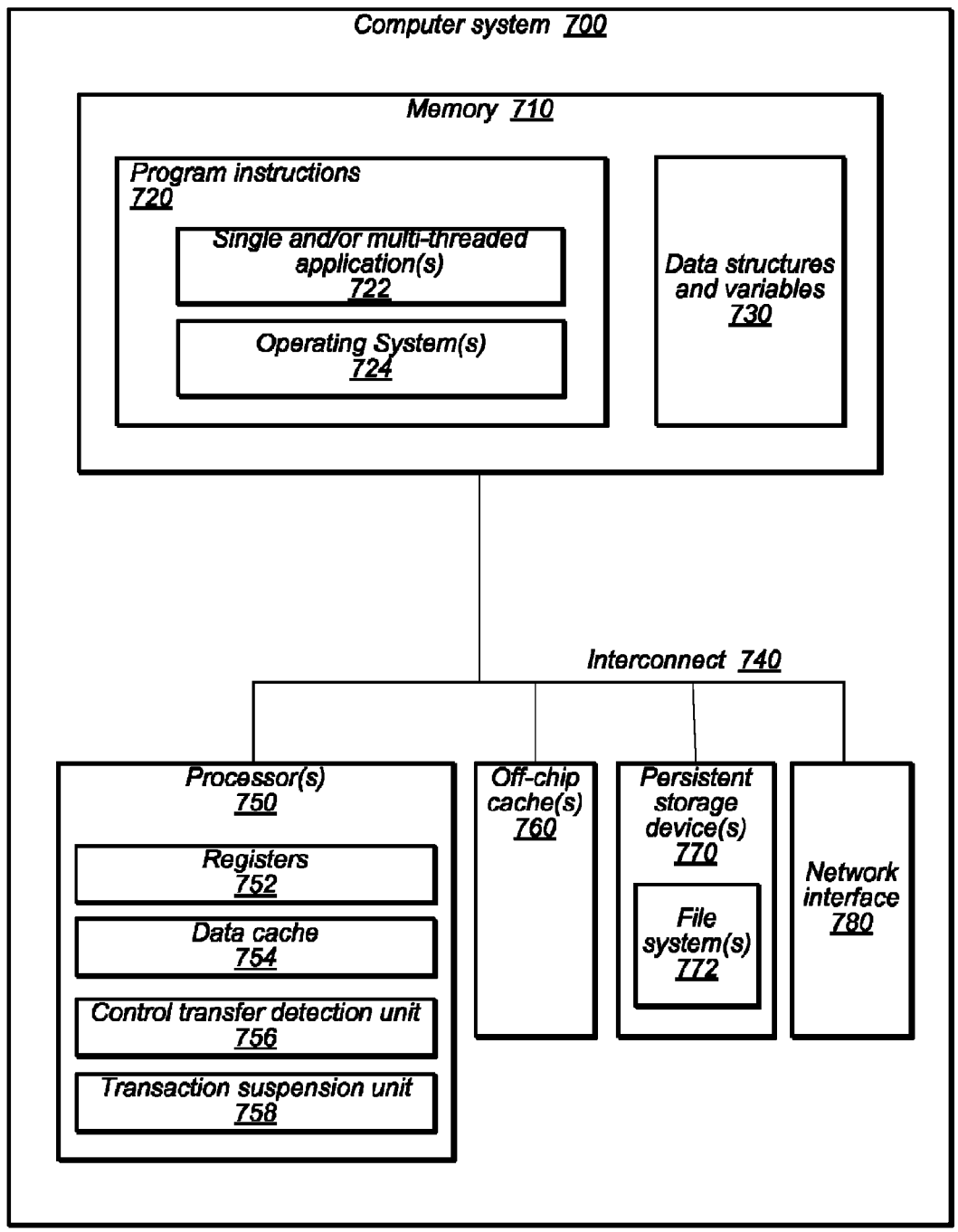
FIG. 7 illustrates a computer system configured to implement a hardware transactional memory system with automatic suspend/resume functionality, as described herein, according to some embodiments.

FIG. 7 illustrates a computer system configured to implement a hardware transactional memory system with automatic suspend/resume functionality, as described herein, according to some embodiments. Computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 700 may include one or more processors 750, each of which may include multiple cores, any of which may be single or multi-threaded. As described herein an in FIG. 1, each processor may comprise registers 752 usable to store various flags and operands. Processor 750 may further comprise data cache 754 configured to cache accessed data and/or to implement a speculative data buffer. For example, data cache 754 may include one or more bits associated with each cache block and usable to denote speculatively read and/or written data. Processor 750 may further include control transfer detection unit 756 for detecting suspend/resume conditions, including by detecting control transfers. According to FIG. 7, processor 750 may also include transaction suspension unit 758 for suspending/resuming transactional execution mode, as described herein.

In the illustrated embodiment, the computer system 700 may also include one or more off-chip caches 760, such as an off-chip L2 or L3 cache. In some embodiments, L2 and/or L3 caches may be implemented on-chip. Computer system 700 may also include persistent storage devices 770 (e.g. optical storage, magnetic storage, hard drive, tape drive, solid state memory, etc), which may store data organized by a file system such as 772. Computer system 700 may also include one or more network interfaces, such as 780, for transmitting and receiving data over any number of networks. Computer system 700 may also include one or more memories 710 (e.g., one or more of cache, SRAM, DRAM, RDRAM, EDO RAM, DDR 7 RAM, SDRAM, Rambus RAM, EEPROM, etc.). Various embodiments may include fewer or additional components not illustrated in FIG. 7 (e.g., video cards, audio cards, additional network interfaces, peripheral devices, a network interface such as an ATM interface, an Ethernet interface, a Frame Relay interface, etc.)

The one or more processors 750, storage device(s) 740, off-chip caches 760, persistent storage devices 770, network interface 780, and system memories 710 may be coupled through system interconnect 740. One or more of the system memories 710 may contain program instructions 720 and various data structures and variables 730. Program instructions 720 may be encoded in platform native binary, any interpreted language such as Java™ byte-code, or in any other language such as C/C++, Fortran, etc or in any combination thereof.

Program instructions 720 may include program instructions executable to implement one or more single and/or multi-threaded programs 722, which may utilize atomic memory transactions, such as by executing initiating and commit instructions, as described herein.

According to the illustrated embodiment, memory 710 may comprise program instructions executable to implement an operating system 724, such as Windows™ and/or Linux. In some embodiments, operating system 724 may include a kernel configured to execute various functions at an elevated level of privilege. For example, operating system 724 may expose an application programming interface (API) defining system calls that applications 722 may invoke. In response to invoking such system calls, processor 750 may suspend an active transaction being executed by the application 722 in a manner substantially transparent to applications 722 and operating system 724, as described herein.

The software programs, such as applications 722, may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The (non-transitory) machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer-readable storage medium as described above can be used in one embodiment to store instructions read by a program and used, directly or indirectly, to fabricate the hardware comprising system processor 750. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 750. The netlist may then be placed and routed to produce a data set describing geometric shapes to be applied to masks. The masks may then be used in various semiconductor fabrication steps to produce a semiconductor circuit or circuits corresponding to processor 750. Alternatively, the database on carrier medium 300 may be the netlist (with or without the synthesis library) or the data set, as desired.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. An apparatus, comprising:
a processor configured to execute a plurality of speculative memory access operations in a transactional mode as a single atomic transaction, including marking data accessed by the speculative memory access operations as being speculative data, and wherein the processor comprises:
   a detection unit configured to determine an implicit suspend condition by detecting at least one of: a control transfer in a thread being executed by the processor and detecting the processor is executing at a specified privilege level; and
   a transaction suspension unit configured to suspend the transactional mode of execution in response to receiving an indication of the implicit suspend condition, wherein in response to suspension of the transactional mode, the processor is configured to suspend marking data as speculative when the data is accessed by memory operations that are executed while the transactional mode is suspended;
   wherein the processor is configured to detect that the single atomic transaction has failed while the single atomic transaction is suspended, and wherein the processor is configured to abort the failed single atomic transaction, including by discarding the speculative data.

2. The apparatus of claim 1, wherein the processor is further configured to abort the failed single atomic transaction only after detecting a resumption condition for the transactional mode of execution for the single atomic transaction.

3. The apparatus of claim 2, wherein suspension of the transactional mode includes the processor setting a suspend flag, and wherein, in response to detecting that the single atomic transaction has failed, the processor is further configured to set an abort flag.

4. The apparatus of claim 3, wherein the processor is configured to save the suspend flag and the abort flag as part of an execution context, wherein the saved execution context is usable to restore state of the processor in the event of a context switch performed by the processor.

5. An apparatus comprising:
a processor configured to execute a plurality of speculative memory access operations in a transactional mode as a single atomic transaction, including marking data accessed by the speculative memory access operations as being speculative data, and wherein the processor comprises:
   a detection unit configured to determine an implicit suspend condition by detecting at least one of: a control transfer in a thread being executed by the processor and detecting the processor is executing at a specified privilege level; and
   a transaction suspension unit configured to suspend the transactional mode of execution in response to receiving an indication of the implicit suspend condition, wherein in response to suspension of the transactional mode, the processor is configured to suspend marking data as speculative when the data is accessed by memory operations that are executed while the transactional mode is suspended;
   wherein the detection unit is configured to determine a resumption condition, including by detecting a return control transfer corresponding to a return from the control transfer, and wherein the processor is configured to resume marking data as being speculative after determining the resumption condition.

6. The apparatus of claim 5, wherein the transaction suspension unit is configured to respond to the determination of the resumption condition by aborting the single atomic transaction in response to determining that the single atomic transaction failed while the transactional mode was suspended, wherein said aborting includes discarding the speculative data.

7. The apparatus of claim 6, wherein, upon the single atomic transaction being resumed, the processor is configured to commit the single atomic transaction, including by marking speculative data marked both before and after suspension of the single atomic transaction as non-speculative.

8. A method comprising:
executing, at a processor, a plurality of speculative memory access operations in a transactional mode as a single atomic transaction, including marking data accessed by the speculative memory access operations as being speculative data;
determining, at the processor, an implicit suspend condition by detecting at least one of: a control transfer in a thread being executed by the processor and detecting the processor is executing at a specified privilege level;
suspending, at the processor, the transactional mode of execution in response to receiving an indication of the implicit suspend condition, wherein in response to suspension of the transactional mode, said suspending the transactional mode includes suspending marking data as speculative when the data is accessed by memory operations that are executed while the transactional mode is suspended;
determining, at the processor, a resumption condition by detecting a return control transfer corresponding to a return from the control transfer; and
resuming, at the processor, marking data as being speculative after determining the resumption condition.

9. The method of claim 8, further comprising:
aborting, at the processor, the single atomic transaction in response to the determination of the resumption condition and in response to determining that the single atomic transaction failed while the transactional mode was suspended, wherein said aborting includes discarding the speculative data.

10. The method of claim 9, further comprising:
committing the single atomic transaction at the processor in response to the single atomic transaction being resumed, said committing including marking speculative data marked both before and after suspension of the single atomic transaction as non-speculative.

* * * * *